United States Patent
Zhang et al.

(10) Patent No.: US 10,416,704 B2
(45) Date of Patent: *Sep. 17, 2019

(54) METHOD AND STRUCTURE FOR DETERMINING GLOBAL CLOCK AMONG SYSTEMS

(71) Applicant: THE WUHAN DIGITAL PET CO., LTD, Hubei (CN)

(72) Inventors: Bo Zhang, Hubei (CN); Lei Fang, Hubei (CN)

(73) Assignee: THE WUHAN DIGITAL PET CO., LTD, Hubei (CN)

( * ) Notice: Subject to any disclaimer, the term of this patent is extended or adjusted under 35 U.S.C. 154(b) by 139 days.

This patent is subject to a terminal disclaimer.

(21) Appl. No.: 15/523,942

(22) PCT Filed: Oct. 29, 2015

(86) PCT No.: PCT/CN2015/093142
§ 371 (c)(1),
(2) Date: May 3, 2017

(87) PCT Pub. No.: WO2016/070744
PCT Pub. Date: May 12, 2016

(65) Prior Publication Data
US 2017/0315582 A1    Nov. 2, 2017

(51) Int. Cl.
*G06F 1/12* (2006.01)
*G06F 1/04* (2006.01)
(Continued)

(52) U.S. Cl.
CPC .......... *G06F 1/12* (2013.01); *G06F 1/04* (2013.01); *G06F 1/10* (2013.01); *H04J 3/0635* (2013.01);
(Continued)

(58) Field of Classification Search
None
See application file for complete search history.

(56) References Cited

U.S. PATENT DOCUMENTS 6,665,316 B1    12/2003    Eidson
10,187,196 B2 *  1/2019    Fang ............... H04L 7/0008
(Continued)

FOREIGN PATENT DOCUMENTS

CN    101656977    2/2010
CN    101971557    2/2011
(Continued)

OTHER PUBLICATIONS

"Search Report of European Counterpart Application," dated May 17, 2018, pp. 1-9.
(Continued)

*Primary Examiner* — Tanh Q Nguyen
(74) *Attorney, Agent, or Firm* — JCIPRNET

(57) ABSTRACT

A method and a structure for determining a global clock among systems are disclosed. When a standardized time reference is required among systems, a reference clock source may transmit a calibration signal, and a transmitting time $T_d(0)$ may be recorded. Each system may respectively record an arrival time $T_a(n)$, transmit a return signal to a signal recording unit of the reference clock source, and record a transmitting time $T_b(n)$, after receiving the calibration signal. Similarly, because of different distances, the signal recording unit may record arrival times $T_d(n)$ of the return signals subsequently, and determine time delays Delay (n) between systems and the reference clock source respectively. When all the systems are required to have a completely standardized time reference, a corresponding Delay (n) may be acquired and transmitted to each system. Each system may determine zero deviations $T_c(n)$ of various local clocks from the reference clock source, and take $T_c(n)$ (Continued)

as a correction parameter to correct its own system clock, so that the local clocks of all the systems have a completely standardized time reference.

15 Claims, 4 Drawing Sheets

(51) Int. Cl.
    *G06F 1/10* (2006.01)
    *H04L 7/00* (2006.01)
    *H04L 12/26* (2006.01)
    *H04J 3/06* (2006.01)
    *H04L 7/10* (2006.01)

(52) U.S. Cl.
    CPC .......... *H04J 3/0638* (2013.01); *H04J 3/0658* (2013.01); *H04J 3/0661* (2013.01); *H04J 3/0667* (2013.01); *H04J 3/0682* (2013.01); *H04J 3/0685* (2013.01); *H04L 7/0008* (2013.01); *H04L 7/0037* (2013.01); *H04L 7/10* (2013.01); *H04L 43/0852* (2013.01)

(56) References Cited

U.S. PATENT DOCUMENTS

| | | |
|---|---|---|
| 2008/0100360 A1 | 5/2008 | Ngo et al. |
| 2010/0103781 A1 | 4/2010 | Rai et al. |
| 2010/0329285 A1 | 12/2010 | Stanton et al. |
| 2011/0066740 A1 | 3/2011 | Campagna |
| 2012/0250704 A1 | 10/2012 | Yamada et al. |
| 2013/0121352 A1 | 5/2013 | Shen et al. |
| 2017/0315582 A1* | 11/2017 | Zhang ........................ G06F 1/12 |
| 2017/0338938 A1* | 11/2017 | Fang ...................... H04L 7/0008 |

FOREIGN PATENT DOCUMENTS

| | | |
|---|---|---|
| CN | 102468898 | 5/2012 |
| CN | 103873178 | 6/2014 |
| CN | 104317354 | 1/2015 |
| JP | H9-230071 | 9/1997 |
| JP | 2000-115210 | 4/2000 |
| JP | 2007-189457 | 7/2007 |
| WO | 2009114930 | 9/2009 |
| WO | 2012065334 | 5/2012 |

OTHER PUBLICATIONS

"International Search Report (Form PCT/ISA/210)", dated Jan. 18, 2016, with English translation thereof, pp. 1-4.

"Written Opinion of the International Searching Authority (Form PCT/ISA/237)" of PCT/CN2015/093142, dated Jan. 18, 2016, pp. 1-10.

* cited by examiner

METHOD AND STRUCTURE FOR DETERMINING GLOBAL CLOCK AMONG SYSTEMS

CROSS-REFERENCE TO RELATED APPLICATION

This application is a 371 of international application of PCT application serial No. PCT/CN2015/093142, filed on Oct. 29, 2015, which claims the priority benefit of China application No. 201410617644.5, filed on Nov. 3, 2014. The entirety of each of the abovementioned patent applications is hereby incorporated by reference herein and made a part of this specification.

FIELD

The present disclosure belongs to a technical field of time test and measurement, which relates generally to a method for determining a reference time, and more particularly, to a method for determining a global clock.

BACKGROUND

The global clock can be used in many fields. Only when the synchronization of global clocks of independent systems is achieved such that the clock of each independent system arrives at a standardized clock reference, the array of these systems can work in cooperation, to ensure there is a consistent measurement condition between systems. It thus is necessary to provide a method for determining an inter-system global clock.

At present, in order to determine an inter-system global clock, a time-stamp communication between multiple systems is generally used to acquire clock references for clocks of these systems, and such clock references are further used for calibration. This way has been widely used in the field of communication. Although this synchronizing method allows the time synchronization between systems, it is limited to use existing communication protocols, which enables the time reference to be packaged into a time stamp, to achieve a global clock synchronization of low precision, for example, in milliseconds, sub-milliseconds, microseconds, or sub-microseconds. The precision in such a way ultimately depends on a clock speed, i.e., flipping frequency, so it does not arrive at a synchronization precision shorten than the clock cycle. A consistent time reference is generally required among multiple independent systems to satisfy an accurate time measurement in some application fields, such as nuclear detection, or time of flight. A completely synchronized global clock has a high requirement for precision, which is required to a range from nanoseconds to picoseconds, and generally smaller than the clock cycle of the system clock. The arrangement of the global clock should consider the slight difference caused by the different orders in which the respective clocks of the systems are powered on, but the traditional methods fail to meet the requirement.

SUMMARY

An objective of the present disclosure is to provide a method and structure for determining a global clock among systems, by which when a standardized time reference is required among multiple systems, the systems may be coupled to each other through a simple network, phase differences between respective clocks of the systems may be determined by means of communication between the systems and a signal recording unit, and each system may be calibrated by its respective clock phase difference, to meet that all the clocks in all the systems have an consistent clock reference.

To achieve the above purpose, the present disclosure provides the followings solutions.

A method for determining a global clock among systems which are connected via paths is provided, including the following steps:

(1) determining a clock source to be a reference clock source covering all the systems;

(2) generating, by the reference clock source, a calibration signal, distributing the calibration signal to each of the systems, and recording a transmitting time $T_d(0)$ of the calibration signal;

(3) recording, by each of the systems respectively, an arrival time $T_a(n)$ of the calibration signal based on a respective local clock upon arrival of the calibration signal at the system, generating a return signal, and recording a transmitting time $T_b(n)$ of the return signal based on the respective local clock;

receiving, by the reference clock source, the return signal from each of the systems, and recording an arrival time $T_d(n)$ upon arrival of the return signal at the reference clock source, to determine an absolute deviation Delay (n) of each of the systems from the reference clock source; and (4) determining a zero deviation $T_c(n)$ of the respective local clock from the reference clock source respectively, based on the absolute deviation Delay (n), the arrival time $T_a(n)$ of the calibration signal or the transmitting time $T_b(n)$ of the return signal, and taking the $T_c(n)$ as a correction parameter to correct the respective local clock of each of the systems, to form a global clock.

$$T_c(n)=(T_a(n)-\text{Delay}(n)-T_d(0)) \text{ or } T_c(n)=(\text{Delay}(n)+T_b(n)-T_d(n)).$$

Preferably, the receiving and recording of the transmitting time $T_d(0)$ of the calibration signal and the arrival time $T_d(n)$ of the return signal are implemented by a signal recording unit cooperated with the reference clock source.

Preferably, in the step (2), the calibration signal is distributed by the signal recording unit cooperated with the reference clock source to each system.

Preferably, the reference clock source and the signal recording unit cooperated with the reference clock source belong to one of the systems.

Preferably, in the step (1), the reference clock source is a timer control unit, or includes a timer control unit and a clock generator under the control of the timer control unit.

Preferably, the calibration signal is formed by an electrical pulse transmitted by the timer control unit directly, or a segment of clock signal transmitted by the clock generator driven by the timer control unit.

Preferably, in the step (3), the arrival time $T_a(n)$ and the transmitting time $T_b(n)$ are determined through the respective local clock in each of the systems and a local signal recording unit cooperated with the local clock.

Further, the determining of the arrival time $T_a(n)$ includes the following steps: recording, by the local signal recording unit, a zero time $t_{a0}(n)$ when the system starts to work based on the respective local clock, when the system is determined to start to work, and the local signal recording unit recording an arrival time $t_{a1}(n)$ of the calibration signal based on the respective local clock when the calibration signal is determined to arrive, such that the arrival time is $T_a(n)=t_{a1}(n)-t_{a0}(n)$; and recording, by the local signal recording unit, a transmitting time $t_{b1}(n)$ of the return signal based on the respective local clock when the return signal is determined to be transmitted, such that the transmitting time is $T_b(n)=t_{b1}(n)-t_{a0}(n)$.

Preferably, in the step (3), the return signal is an acknowledgement signal transmitted from each of the systems respectively, or a returned calibration signal.

Preferably, (I) if the return signal is a returned acknowledgement signal, the absolute deviation of each system meets Delay $(n)=(T_d(n)-T_d(0)-\Delta n)/2$, wherein $\Delta n$ is a response time of the respective system; and (II) if the return signal is a returned calibration signal, the absolute deviation of each system meets Delay $(n)=(T_d(n)-T_d(0))/2$, and the transmitting time of the return signal meets $T_b(n)=T_a(n)$.

Preferably, in the step (I), the $\Delta n$ is a system default value; or the $\Delta n$ is determined by a signal recording unit in the respective system, such that $\Delta n=T_a(n)-T_b(n)$.

The signal recording unit cooperated with the reference clock source has a minimum time measure scale less than a half of a clock cycle of the reference clock source; and the local signal recoding unit has a minimum time measure scale less than a half of a clock cycle of the local clock.

Preferably, the signal recording unit has a minimum time measure scale within 1 ns.

Further, the signal recording unit has a minimum time measure scale within 100 ps.

A structure for determining a global clock among systems is also provided, including systems connected via paths, a reference clock source and a signal recording unit cooperated with the reference clock source, wherein the signal recording unit is in a path connection with the reference clock source, and each of the systems is in communication with the reference clock source through the signal recording unit to determine a zero deviation of various local clocks in the respective system and the reference clock source.

The signal recording unit cooperated with the reference clock source is communicatively connected in two-way with the systems.

Preferably, the signal recording unit cooperated with the reference clock source is in a wired connection with the reference clock source, the signal recording unit cooperated with the reference clock source is in a wired connection with the systems, and the systems are in wired connections with each other.

Preferably, each of the systems is provided with a local clock and a signal recording unit in a path connection with the local clock respectively. Preferably, the local clock of one of the systems serves as the reference clock source.

The systems are communicatively connected with each other sequentially to form at least one linear network structure, and the signal recording unit cooperated with the reference clock source is communicatively connected with one of the systems in each linear network structure.

The signal recording unit cooperated with the reference clock source is communicatively connected with a system at an end of each linear network structure.

Preferably, the systems are communicatively connected in two-way with each other.

Preferably, one of the at least one linear network structure is provided.

The systems are in direct communication connections the signal recording unit cooperated with the reference clock source respectively, to form a star network structure.

The signal recording unit cooperated with the reference clock source has a minimum time measure scale less than a half of a clock cycle of the reference clock source.

The local signal recoding unit has a minimum time measure scale less than a half of a clock cycle of the local clock.

Preferably, the signal recording unit includes a controller and a time converter in communication with and driven by the controller, and the time converter has a time precision within 1 ns.

Preferably, the time converter is a TDC or TAC with a time precision within 100 ps.

The reference clock source is a timer control unit, or includes a timer control unit and a clock generator under the control of the timer control unit.

Because of the above solutions, the present disclosure has the following beneficial effects.

1. For the method and structure for determining a global clock among systems, each system can work depending on its own clock when working independently. When a standardized global time reference is required among these systems, the reference clock source may transmit a calibration signal firstly, and the signal recoding unit of the reference clock source may start to record the time $T_d(0)$. The systems may receive the calibration signal sequentially, due to the different distances from the systems to the reference clock source. For each of the systems, the signal recording unit inside may record the arrival time $T_a(n)$ of the calibration signal after receiving the calibration signal, the return signal (an acknowledgement signal or the calibration signal returned directly through an electrical connection) may be transmitted immediately to the signal recording unit of the reference clock source, and the transmitting time $T_b(n)$ of the return signal may be recorded. Similarly, because of different distances, the signal recording unit may receive the return signal from the systems sequentially, and record the arrival times $T_d(n)$. The time delay between the system and the reference clock source is Delay $(n)=(T_d(n)-T_d(0))/2$ or Delay $(n)=(T_d(n)-T_d(0)-\Delta n)/2$, where the value of $\Delta n$ is determined by the above steps, based on the applications. The length of the wire connected between the system and the reference clock source may be calculated as $L(n)=\text{Delay}(n)*C$, where C is a velocity close to the velocity of light. When all the systems are required to have a completely standardized time reference, the reference system may acquire corresponding data of Delay (n), and transmit the data to each system respectively. Each system may calculate the zero deviations $T_c(n)$ of its own local clock from the reference clock source, that is, $T_c(n)=(T_a(n)-\text{Delay}(n)-T_d(0))$ or $T_c(n)=(\text{Delay}(n)+T_b(n)-T_a(n))$, which may be used to correct its own system clock as a correction parameter. (1) If $T_c(n)>0$, it means that the zero point of the system clock is earlier than the reference clock source, and this value should be subtracted from the timing system of this system. (2) If $T_c(n)<0$, it means that the zero point of the system clock is later than the reference clock source, and this value should be added to the timing system of this system.

2. By incorporating high-precision signal recording units, the synchronization precision of time is improved. The reference clock source is provided with a high-precision signal recording unit, and each system is also provided with a signal recording unit cooperated with its local clock inside. The minimum time measure scale of the signal recording unit is less than a half of a clock cycle of the reference clock source. The signal recording unit can be a time digital converter (TDC), or a time analog converter (TAC), which may be used together with the reference clock source and the local clock of each system to determine the zero deviation $T_c(n)$ of the local clock of each system from the reference clock source, so that the time absolute deviation between each system and the reference clock source can be determined precisely, to form a global clock.

3. The normalized correction of times of the systems can be achieved through the time measurements and communication between the systems, without the complex design for the special and reliable clock lines.

4. The scalability of the systems is improved. When the systems are connected in a linear network structure, any new system can be incorporated. Only one measurement should be implemented, so that the new incorporated system can be ensured to have a consistent time reference with other systems.

DETAILED DESCRIPTION OF THE PREFERRED EMBODIMENTS

The present disclosure will be further described by reference to the following embodiments taken in conjunction with the accompanying drawings.

Figure 1:
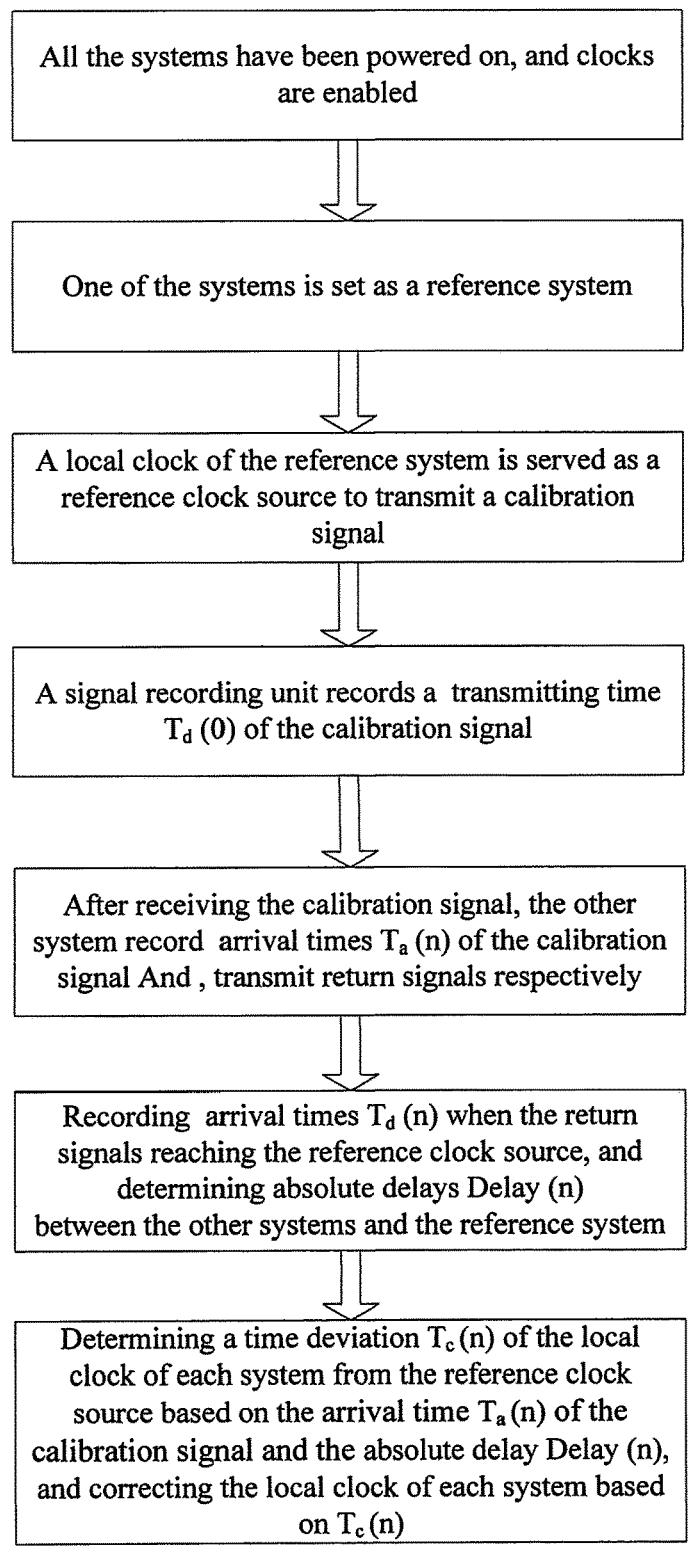
FIG. 1 is a flow diagram illuminating a method for determining a global clock among systems according to one embodiment of the present disclosure.

The present disclosure discloses a method for determining a global clock among systems which are connected via paths. As shown in FIG. 1, it includes the following steps.

(1) A clock source may be determined to be a reference clock source covering all the systems. Firstly, a clock source is determined to be a reference clock source from which a calibration signal is generated.

Each system has its own local clock inside, so there is a need for determining only one clock source to be a reference clock source firstly. The reference clock source may be chosen arbitrarily, only if this reference clock source is able to be transmitted to all the systems through the network (i.e., covering all the systems). The reference clock source may be chosen from the local clocks of the systems, or may be a separate external clock source. As a preferred embodiment, the above reference clock source may be determined from the local clocks of the systems, and may be configured to be a timer control unit alone, or include a timer control unit and a clock generator under the control of the timer control unit, according to practical requirements.

(2) The reference clock source may generate a calibration signal, distributing the calibration signal to each of the systems, and record a transmitting time $T_d(0)$ of the calibration signal.

As mentioned, the calibration signal is generated by reference clock, so the calibration signal may be formed by an electrical pulse transmitted by the timer control unit directly, or a segment of clock signal transmitted by the clock generator driven by the timer control unit. The calibration signal needs to be transmitted to each system after it has been generated. In this embodiment, the calibration signal is distributed by a signal recording unit cooperated with the reference clock source to each system. The signal recording unit may include a controller and a time converter driven by the controller.

The reference clock source and the signal recording unit cooperated with the reference clock source may belong to one of the systems, and the signal recording unit cooperated with the reference clock source may receive and record the transmitting time $T_d(0)$ of the calibration signal.

(3) Each of the systems may record an arrival time $T_a(n)$ of the calibration signal based on a respective local clock respectively, after the calibration signal arriving at the system, generate a return signal, and record a transmitting time $T_b(n)$ of the return signal based on the respective local clock; and the reference clock source may receive the return signal from each of the systems, and record an arrival time $T_d(n)$ when the return signal arriving at the reference clock source, to determine an absolute deviation Delay (n) of each of the systems from the reference clock source.

The transmitting time $T_d(0)$ of the calibration signal and the arrival time $T_d(n)$ of the return signal may be recorded by a same timing element, to ensure a same temporal precision as the timing element. In the embodiment as shown in FIG. 1, $T_d(0)$ and $T_d(n)$ are received and recorded by the signal recording unit cooperated with the reference clock source, and specifically, values of $T_d(0)$ and $T_d(n)$ are recorded by the time converter driven by the controller.

In the step (3), if the precision is not considered, the arrival time $T_a(n)$ of the calibration signal reading each system and the transmitting time $T_b(n)$ of the return signal may be determined and recorded by each system based on its own local clock, and the arrival time $T_a(n)$ and the transmitting time $T_b(n)$ may also be determined by the respective local clock of each system and the local signal recording unit cooperated with the local clock. The local signal recording unit in each system has a same structure as the signal recording unit cooperated with the reference clock source, and is in a bidirectional communication with the local clock. When the system is determined to start to work, the local signal recording unit records a zero time $t_{a0}(n)$ when the system starts to work based on the respective local clock, and the local signal recording unit records an arrival time $t_{a1}(n)$ of the calibration signal (pulse or clock signal) based on the respective local clock when the calibration signal is determined to arrive, such that the arrival time is $T_a(n)=t_{a1}(n)-t_{a0}(n)$; the local signal recording unit records a transmitting time $t_{b1}(n)$ of the return signal based on the respective local clock when the return signal is determined to be transmitted, such that the transmitting time is $T_b(n)=t_{b1}(n)-t_{a0}(n)$.

The return signals respectively generated by the systems may be in various forms. The above step will be further described in the case, for example, the return signals are acknowledgement signals transmitted from the systems respectively, or calibration signals returned respectively. It should be understood that the method described by the present disclosure may also enable the formation of the global clock among the systems if the return signal is in other forms.

After the calibration signal arriving at a respective system, the system may return the calibration signal through an electrical connection directly, or receive the calibration signal with a controller (for example, a FPGA which is a controller supporting an asynchronous response) and transmit an acknowledgement signal immediately (independent of the master clock of the controller). Then, the arrival time $T_d$ (n) arriving at the reference clock source may be recorded to determine the absolute deviation Delay (n).

(I) If the return signal is a returned acknowledgement signal, the absolute deviation of each system meets Delay (n)=($T_d$(n)−$T_d$(0)−Δn)/2, wherein Δn is a response time of the respective system. In the step (I), if the time precision is not considered, Δn may be a default value which is predetermined by experiments and computation and stored in each system. In addition, Δn may also be determined by the local clock of the system and the local signal recording unit, and Δn=$T_b$(n)−$T_a$(n).

(II) If the return signal is a returned calibration signal, Delay (n)=($T_d$(n)−$T_d$(0))/2.

(4) The clocks of the system may be adjusted to form a global clock, based on the absolute deviation Delay (n) and the arrival time Ta (n) of the calibration signal, or based on the absolute deviation Delay (n) and the transmitting time Tb (n) of the return signal: determining a zero deviation $T_c$(n) of the respective local clock from the reference clock source respectively, $T_c$(n)=($T_a$ (n)−Delay (n)−$T_d$ (0)) or $T_c$ (n)= (Delay (n)+$T_b$(n)−$T_d$ (n)), and taking the $T_c$ (n) as a correction parameter to correct the respective local clock of each system, to form a global clock.

During the process of the transmitting of the calibration signal to arriving at a respective system, there is $T_d$ (0)+ Delay (n)=(n)−$T_c$ (n), and $T_c$ (n)=(n)−$T_d$ (0)−Delay (n)={$T_a$ (n)−(($T_d$(n)+$T_d$ (0))/2−Δn/2}. If the return signal is the calibration signal, Δn=0. During the process of the transmitting of the return signal to arriving at the reference clock source, there is $T_d$ (n)−Delay (n)−$T_b$ (n)−$T_c$ (n), and $T_c$ (n)=$T_b$ (n)−$T_d$(n)+Delay (n)−{$T_a$(n)−(($T_d$(n)+$T_d$(0))/2−Δn/2}. If the return signal is the calibration signal, Δn=0.

The $T_c$(n) may be used as a correction parameter for correcting the local clock of each system, after its value has been determined.

(1) If $T_c$ (n)>0, it means that the zero point of the system clock is earlier than the reference clock source, and this value should be subtracted from the timing system of this system.

(2) If $T_c$ (n)<0, it means that the zero point of the system clock is later than the reference clock source, and this value should be added to the timing system of this system. In this way, all the systems are ensured to have a completely consistent time reference.

In the above method, the reference system (i.e., a system in which its local clock serves as a reference clock source) may transmit a calibration signal and determine Delay (n), and the other systems may determine $T_a$ (n) and $T_b$ (n). Because each system is provided with a local clock and a signal recording unit, any one of the other systems may transmit a calibration signal and determine Delay (n), and the reference system may measure $T_a$ (n) and $T_b$ (n). In addition, because both of the reference system and the other system have a signal processing function, the measured Delay (n), $T_a$ (n) and $T_b$ (n) may be transmitted to each other. After acquiring the Delay (n), $T_a$ (n) and $T_b$ (n) through the network, anyone may determine the correction parameter $T_c$ (n), and transmit $T_c$ (n) to each system for correction, or transmit $T_c$ (n) to a central processing unit of overall systems for global correction.

In the method provided by the present disclosure, each system has its own local clock. Each system can work depending on its own clock when working independently. When a standardized global time reference is required among these systems, the global clock among the systems can be standardized conveniently and quickly by the above method for determining the global clock among systems, which can be used in various fields as required.

Based on the above embodiment, the present disclosure further discloses a method for determining a global clock among systems, which can improve the precision of the time synchronization, to be used in applications with a high requirement for time precision.

A method for determining a global clock among systems which are connected via paths is provided, including the following steps.

(1) A clock source may be determined to be a reference clock source covering all the systems. Firstly, a clock source is determined to be a reference clock source from which a calibration signal is generated.

Each system has its own local clock inside, so there is a need for determining only one clock source to be a reference clock source firstly. The reference clock source may be chosen arbitrarily, only if this reference clock source is able to be transmitted to all the systems through the network (i.e., covering all the systems). The reference clock source may be chosen from the systems, or may be a separate external clock source. In this embodiment, the above reference clock source may be a timer control unit alone, or include a timer control unit and a clock generator under the control of the timer control unit, according to practical requirements.

(2) The reference clock source may generate a calibration signal which may be distributed to each of the systems directly or through a signal recording unit cooperated with the reference clock source, and signal recording unit cooperated with the reference clock source may record a transmitting time $T_d$ (0) of the calibration signal.

As mentioned, the calibration signal is generated by reference clock, so the calibration signal may be formed by an electrical pulse transmitted by the timer control unit directly, or a segment of clock signal transmitted by the clock generator driven by the timer control unit. The calibration signal needs to be transmitted to each system after it has been generated. In this embodiment, the calibration signal is distributed by a signal recording unit cooperated with the reference clock source to each system. The signal recording unit has a minimum time measure scale less than a half of a clock cycle of the reference clock source, and includes a controller and a time converter driven by the controller. The reference clock source and the signal recording unit cooperated with the reference clock source may belong to one of the systems to facilitate the arrangement of the system wiring. The signal recording unit cooperated with the reference clock source may record the transmitting time $T_d$ (0) of the calibration signal while distributing the calibration signal to each system.

(3) Each of the systems may record an arrival time $T_a$ (n) of the calibration signal based on a respective local clock and a local signal recording unit respectively, after the calibration signal arriving at the system, generate a return signal, and record a transmitting time $T_b$ (n) of the return signal based on the respective local clock and the local signal recording unit; and the signal recording unit cooperated with the reference clock source may receive the return signal, and record an arrival time $T_d$ (n) when the return signal arriving at the reference clock source, to determine an absolute deviation Delay (n) of each of the systems.

Both of the transmitting time $T_d$ (0) of the calibration signal and the arrival time $T_d$ (n) of the return signal may be a high precision signal recording unit cooperated with the reference clock source, and specifically, values of $T_d$ (0) and $T_d$ (n) are recorded by the time converter driven by the controller. The signal recording unit cooperated with the reference clock source has a minimum time measure scale less than a half of a clock cycle of the reference clock source, so that the signal recording unit is able to measure a time less than one clock cycle precisely. For a global clock with a high requirement for synchronization, the global clock frequency is generally above 50 MHz with a clock cycle within 20 ns, or even up to 200 MHz with a clock cycle within 2 ns. However, the delay of the global clock in the line may also be measured precisely, which may vary as the length of the line, and have a different phase from the system global clock. To measure the delay precisely, a clock measuring device of high precision is required, without depending on the global clock. A signal measuring element with a minimum time measure scale less than a half of a clock cycle of the reference clock source can achieve a higher precision time measurement, such as line delay or phase deviation.

As a preferred embodiment, the signal recording unit may include a controller and a time converter driven by the controller. The time converter has a minimum time measure scale within 1 ns, to enable precise record the transmitting time $T_d$ (0) of the calibration signal and the arrival time $T_d$ (n) of the return signal, to be used in application with a requirement for time precision in ps.

Further, the time converter may be a TDC (time digital converter) or TAC (time analog converter) with a time precision within 100 ps. For TDC, a controller may control the TDC and read values (recorded time values) of the TDC. The TDC times asynchronously, that is, it is triggered instantly, generally at a jumping edge of the electrical pulse, for the clock signal, so there is no communication overhead, and the TDC does not depend upon too much about the master clock frequency. The timing precision can achieve 10 ps by timing with a circuit delay chase circuit. Thus, when a signal recording unit with a time precision within 100 ps is used for recording transmitting times and returning times of signals, the requirement for time synchronization precision to reach ps can be satisfied, and it can be used in a field with a high requirement for time precision, such as scanning imaging system.

The arrival time $T_a$ (n) and the transmitting time $T_b$ (n) may also be determined by the respective local clock of each system and the high time precision local signal recording unit cooperated with the local clock. The local signal recording unit in each system has a same structure as the signal recording unit cooperated with the reference clock source. Similarly, the local signal recoding unit has a minimum time measure scale less than a half of a clock cycle of the local clock. Both of the signal recording unit cooperated with the reference clock source and the local signal recoding unit have the same level of minimum time measure. When the system is determined to stall to work, the local signal recording unit records a zero time $t_{a0}(n)$ when the system starts to work, and the local signal recording unit records an arrival time $t_{a1}(n)$ of the calibration signal (pulse or clock signal) based on the respective local clock when the calibration signal is determined to arrive, such that the arrival time is $T_a$ (n)=$t_{a1}(n)$-$t_{a0}(n)$. The local signal recording unit records a transmitting time $t_{b1}$ (n) of the return signal (a pulse or clock signal or an acknowledgement signal) based on the respective local clock when the return signal is determined to be transmitted, such that the transmitting time is $T_b$ (n)=$t_{b1}(n)$-$t_{a0}(n)$. This will ensure $T_a$ (n) and $T_b$ (n) have the same level of precision as the $T_d$ (0) and $T_d$(n).

The return signals respectively generated by the systems may be in various forms. The above step will be further described in the case, for example, the return signals are acknowledgement signals transmitted from the systems respectively; or calibration signals returned respectively. It should be understood that the method described by the present disclosure may also enable the formation of the global clock among the systems if the return signal is in other forms. After the calibration signal arriving at a respective system, the system may return the calibration signal through a electrical connection directly, or receive the calibration signal with a controller (for example, a FPGA which is a controller supporting an asynchronous response) and transmit an acknowledgement signal immediately (independent of the master clock of the controller). Then, the arrival time $T_d$ (n) arriving at the reference clock source may be recorded to determine the absolute deviation Delay (n).

(I) If the return signal is a returned acknowledgement signal, the absolute deviation of each system meets Delay (n) ($T_d$(n)-$T_d$(0)-Δn)/2, wherein Δn is a response time of the respective system. Considering the time precision, Δn may be determined by the local signal recording unit that Δn=$T_b$ (n)-$T_a$ (n).

(II) If the return signal is a returned calibration signal, Delay (n)=($T_d$ (n)-$T_d$ (0))/2.

(4) The clocks of the system may be adjusted to form a global clock, based on the absolute deviation Delay (n) and the arrival time Ta (n) of the return signal: determining a zero deviation $T_c$ (n) of the respective local clock from the reference clock source respectively, $T_c$ (n)=($T_a$ (n)-Delay (n)-$T_d$ (0)) or $T_c$ (n)=(Delay (n)+$T_b$ (n)-$T_d$ (n)), and taking the $T_c$ (n) as a correction parameter to correct the respective local clock of each system, to form a global clock.

During the process of the transmitting of the calibration signal to arriving at a respective system, there is $T_d$ (0)+Delay (n)=$T_a$ (n)-$T_c$ (n), and $T_c$ (n)=$T_a$ (n)-$T_d$ (0)-Delay (n)={$T_a$ (n)-(($T_d$ (n)+$T_d$ (0))/2-Δn/2}. If the return signal is the calibration signal, Δn=0. During the process of the transmitting of the return signal to arriving at the reference clock source, there is $T_d$ (n)-Delay (n)=$T_b$ (n)-$T_c$ (n), and $T_c$ (n)=$T_b$ (n)-$T_d$ (n)+Delay (n)={$T_a$ (n)-(($T_d$ (n)+$T_d$ (0))/2-Δn/2}. If the return signal is the calibration signal, Δn=0.

The $T_c$(n) may be used as a correction parameter for correcting the local clock of each system, after its value has been determined.

(1) If $T_c$ (n)>0, it means that the zero point of the system clock is earlier than the reference clock source, and this value should be subtracted from the timing system of this system.

(2) If $T_c$ (n)<0, it means that the zero point of the system clock is later than the reference clock source, and this value should be added to the timing system of this system. In this way, all the systems are ensured to have a completely consistent time reference.

In the above embodiment, a high-precision timing unit is used to determine the time required to be determined in this method. It can not only address the synchronization problem of the global clock among systems, but also improve the precision of time synchronization, so it can be used in the fields with a high requirement for the precision of time synchronization, such as nuclear detection, or time of flight.

Corresponding to the above method, the present disclosure also discloses a structure for determining a global clock among systems, including at least two systems, a reference clock source and a signal recording unit cooperated with the reference clock source. The above systems are connected via paths. The signal recording unit is in a path connection with the reference clock source, and each of the systems is in communication with the reference clock source through the signal recording unit to determine a zero deviation of various local clocks in the respective system and the reference clock source.

Figure 2:
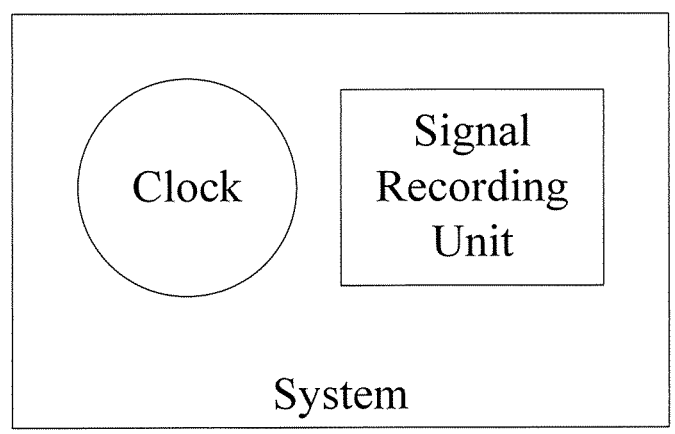
FIG. 2 is a schematic diagram showing the connection between the clock source and the clock recording unit in a system.

As shown in FIG. 2, the reference clock source and the signal recording unit cooperated with the reference clock source may belong to one of the systems, or may be separate from or external to the systems. The operating principle of the structure according to the present disclosure will be further described in the case that the reference clock source and the signal recording unit belong to one of the systems.

A plurality of systems may be connected together through an existing (or newly created simple) communication network. When each system is powered on to start working, the local clock in each system may also start working. Due to the difference in the power-on time and the starting of oscillation of the local clock of each system, the local clock of each system may not start at a same time. The structure for determining a global clock among systems proposed by the present disclosure may obtain relative difference values between systems with the timing and comparison of the signal recording unit, the reference clock source and the local clock of each system. These difference values may be used to standardize the respective clocks to a consistent time reference to achieve the arrangement of the global clock. Specifically, any one of the system is chosen to be provided with a local clock serving as a reference clock source and a signal recording unit in a path connection with the local clock serving as a timing element. The reference clock source may transmit a calibration signal to other systems, and record the transmitting time $T_d$ (0) of the calibration signal by its signal recording unit. Each of the other systems may receive the calibration signal, record the arrival time $T_a$ (n) of the calibration signal, and generate a return signal. After the return signal arriving at the reference clock source, the signal recording unit cooperated with the reference clock source may record the e arrival time $T_d$ (n) of the return signal. By the calculation of $T_d$ (n) and $T_d$ (0), the distance of the each of the other systems from the reference system may be calculated, that is, a fixed time difference Delay (n) may be calculated. The reference system may transmit the calculated time difference Delay (n) to all of the other systems. Meanwhile, each of the other systems may calculate the difference value between its own zero time and the zero time of the reference system by its calculated Ta (n) and received Delay (n), that is the difference value of time reference, by which each system corrects its own clock system, for example, providing a corresponding delay for its clock system, so that the overall systems may have a completely consistent time reference. The above various difference values may also be determined by other processors.

In this embodiment, the return signal may be an original calibration signal or an acknowledgement signal transmitted by the system itself. If the return signal is the calibration signal, Delay (n)=($T_d$(n) (0))/2 without considering the time cost. If the return signal is the acknowledgement signal, there is a time cost for acknowledgement, Delay (n)=($T_d$ (n)-$T_d$(0)-Δn)/2. When the structure is used in a field which is not strict in time precision, the signal recording unit may be a common timing element that the determination of the global clock among the systems may be achieved effectively. The arrival time $T_a$ (n) and the transmitting time $T_b$ (n) may be determined by the local clock of each system independently. An may be default value for each system, which is determined by experiments and computation and stored in each system.

However, when the structure proposed by the present disclosure is used in applications with a high requirement for time precision, the signal recording unit has a minimum time measure scale less than a half of a clock cycle of the reference clock source. Each system should be provided with a signal recording unit inside. The signal recording unit in each system has a same structure and minimum time measure scale as the signal recording unit cooperated with the reference clock source. The signal recording unit may include a controller and a high precision time converter driven by the controller. The signal recording unit may be in a patch connection with the local clock in each system. Such signal recording unit is able to measure a time less than one clock cycle precisely. For a global clock with a high requirement for synchronization, the global clock frequency is generally above 50 MHz with a clock cycle within 20 ns, or even up to 200 MHz with a clock cycle within 2 ns. However, the delay of the global clock in the line may also be measured precisely, which may vary as the length of the line, and have a different phase from the system global clock. To measure the delay precisely, a clock measuring device of high precision is required, without depending on the global clock. A signal measuring element with a minimum time measure scale less than a half of a clock cycle of the reference clock (local clock) can achieve a higher precision time measurement, such as line delay or phase deviation.

As a preferred embodiment, the time converter has a minimum time measure scale within 1 ns. Further, in this embodiment, the time converter may be a TDC (time digital converter) or TAC (time analog converter) with a time precision within 100 ps. For TDC, a controller may control the TDC for recording and reading time values (recording and reading values of $T_d$ (0) and $T_d$ (n)). The TDC times asynchronously, that is, it is triggered instantly, generally at a jumping edge of the electrical pulse, for the clock signal, so there is no communication overhead, and the TDC does not depend upon too much about the master clock frequency. The timing precision can achieve 10 ps by timing with a circuit delay chase circuit to measure a time length less than the clock cycle of the reference clock source (local clock). Thus, a time conversion unit of such precision may enable the measurement of zero point of the clock of each system to the reference clock source, the requirement for time synchronization precision to reach ps can be satisfied, and it can be used in a field with a high requirement for time precision, such as scanning imaging system.

With such configuration, the arrival time $T_a$ (n) of the calibration signal and the transmitting time $T_b$ (n) of the return signal may be determined by the respective local clock of each system and the high time precision local signal recording unit cooperated with the local clock. When the system is determined to start to work, the local signal recording unit records a zero time $t_{a0}(n)$ when the system starts to work, and the local signal recording unit records an arrival time $t_{a1}(n)$ of the calibration signal when the calibration signal is determined to arrive, such that the arrival time is $T_a$ (n)=$t_{a1}(n)$-$t_{a0}(n)$. The local signal recording unit records a transmitting time $t_{b1}(n)$ of the return signal when the return signal is determined to be transmitted, such that the transmitting time is $T_b$ (n)=$t_{b1}(n)$-$t_{a0}(n)$. This will ensure $T_a$ (n) and $T_b$ (n) have the same level of precision as the $T_d$ (0) and $T_d$ (n).

If the return signal is an acknowledgement signal, Δn=$T_b$ (n)-$T_a$ (n). The value of Δn determined in this way has the same level of precision as the $T_d$ (0) and $T_d$ (n) to ensure the precision of the zero point of clock.

The signal recording unit cooperated with the reference clock source may achieve the exchange of the calibration signal (acknowledgement signal) with each system through one line. The signal recording unit cooperated with the reference clock source may also be in a bidirectional communication with the systems to exchange signals. In the case that one line is used to achieve the signal round trip, the calibration signal may be broadcasted as all the systems being in connection with each other, and both of the signal recording unit and the other systems may receive the calibration signal. The controllers of the other systems may transmit a signal (which is preferably a signal different from the calibration signal of the reference clock source) immediately after receiving the calibration signal respectively, to make the other systems not consider the calibration signal as the signal of reference clock source. In the case that the signal recording unit cooperated with the reference clock source is in a bidirectional communication with the systems, the transmitting and receiving of the calibration signal are separated from one another, without considering the above issue. The transmitting and receiving of signals are easier.

In addition, in the structure proposed by the present disclosure, the signal measurement is based on circuit signals (jumping of the electrical pulse) to precisely acquire the time delays and deviations of different systems. The signal transmission through a fixed medium has a more deterministic delay and deviation. In order to achieve the requirement for the precision of the global clock to ps, the reference clock source is in a wired connection with the signal recording unit, the signal recording unit is in a wired connection with the systems, and the systems are in wired connections with each other.

By the above analysis, for the structure for determining a global clock among systems proposed by the present disclosure, each system is only required to be in communication with the reference clock source through the signal recording unit, so as to enable the arrangement of the global clock among the systems. In addition, a high time precision signal recording unit is used to determine the zero point of clock between the system and the reference clock source, so it is suitable for the applications with a high requirement for time precision.

The structure for determining a global clock among systems proposed by the present disclosure will be further described by reference to the following embodiments.

Figure 3:
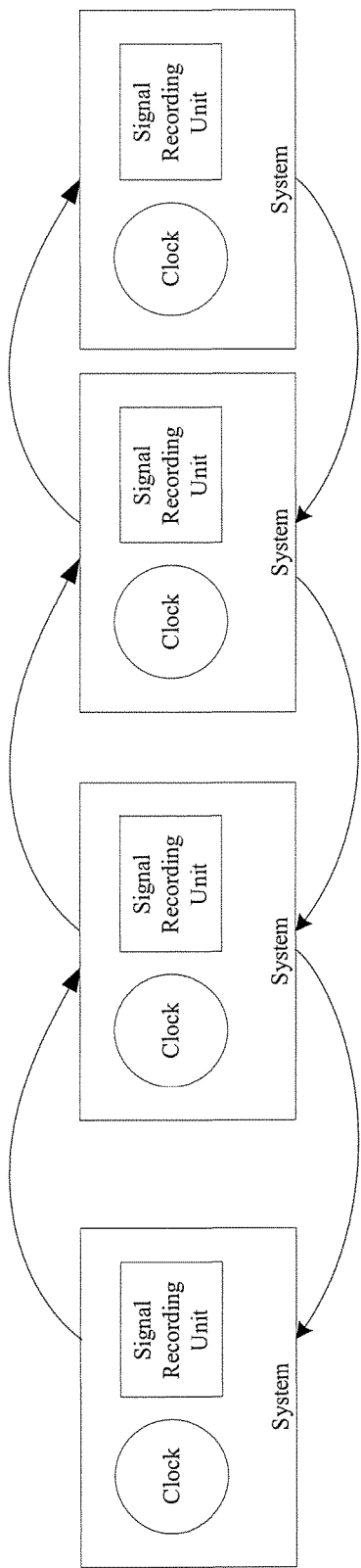
FIG. 3 is a structural schematic diagram illuminating a structure for determining a global clock among systems according to a first embodiment of the present disclosure.

In the first embodiment, as shown in FIG. 3, a structure for determining a global clock among systems is provided, including at least two systems, a reference clock source and a signal recording unit cooperated with the reference clock source. The signal recording unit is in a path connection with the reference clock source, and the systems are in bidirectional communication with each other to form a linear network. There may be a plurality of linear networks. The signal recording unit cooperated with the reference clock source is in bidirectional communication with one of the systems in each linear network. In the embodiment as shown in FIG. 3, it is preferably to provide one linear network, in which the systems are bidirectional communication with each other. The signal recording unit cooperated with the reference clock source is in bidirectional communication with a system at the head of the linear network. The reference clock source is in a wired connection with the signal recording unit, the signal recording unit is in a wired connection with the system at the head, and the systems are in wired connections with each other.

All the systems are in series through the linear network. Only one reference clock source is arranged at a node (an end of the linear network in the embodiment as shown in FIG. 3, to make sure the systems have different distances from the reference clock source) of the linear network. A high precision signal recording unit is also arranged. The reference clock source may transmit a calibration signal firstly, and the signal recoding unit of the reference clock source may start to record the time $T_d(0)$. The systems may receive the calibration signal sequentially, due to the different distances from the systems to the reference clock source. For each of the systems, the signal recording unit inside may record the arrival time $T_a(n)$ of the calibration signal after receiving the calibration signal, the return signal (an acknowledgement signal or the calibration signal returned directly through an electrical connection) may be transmitted immediately by the system to the signal recording unit of the reference clock source, and the transmitting time $T_b(n)$ of the return signal may be recorded. Similarly, because of different distances, the signal recording unit may receive the return signal from the systems sequentially, and record the arrival times $T_d(n)$. The time delay between the system and the reference clock source is Delay $(n)=(T_d(n)-T_d(0))/2$ or Delay $(n)=(T_d(n)-T_d(0)-\Delta n)/2$, where the value of $\Delta n$ is determined by the above steps, based on the applications. The length of the wire connected between the system and the reference clock source may be calculated as L $(n)$=Delay $(n)*C$, where C is a velocity close to the velocity of light. When all the systems are required to have a completely standardized time reference, the reference system may acquire corresponding data of Delay $(n)$, and transmit the data to each system respectively. Each system may calculate the zero deviations $T_c(n)$ of its own local clock from the reference clock source, that is, $T_c(n)=(T_a(n)-$Delay $(n)-T_d(0))$ or $T_c(n)=($Delay$(n)+T_b(n)-T_d(n))$, which may be used to correct its own system clock as a correction parameter.

(1) If $T_c(n)>0$, it means that the zero point of the system clock is earlier than the reference clock source, and this value should be subtracted from the timing system of this system.

(2) If $T_c(n)<0$, it means that the zero point of the system clock is later than the reference clock source, and this value should be added to the timing system of this system.

If a plurality of linear networks are provided, it is likely that a plurality of systems have the same distance from the reference clock source. During this process, if the acknowledgement signals received by the signal recording unit cooperated with the reference clock source is less than the number of systems n (which means there are at least two signals overlapped, and it has a very low probability because the signal recording unit is able to identify a signal with a difference above 10 ps to one other), the systems may be measured in batches.

Figure 4:
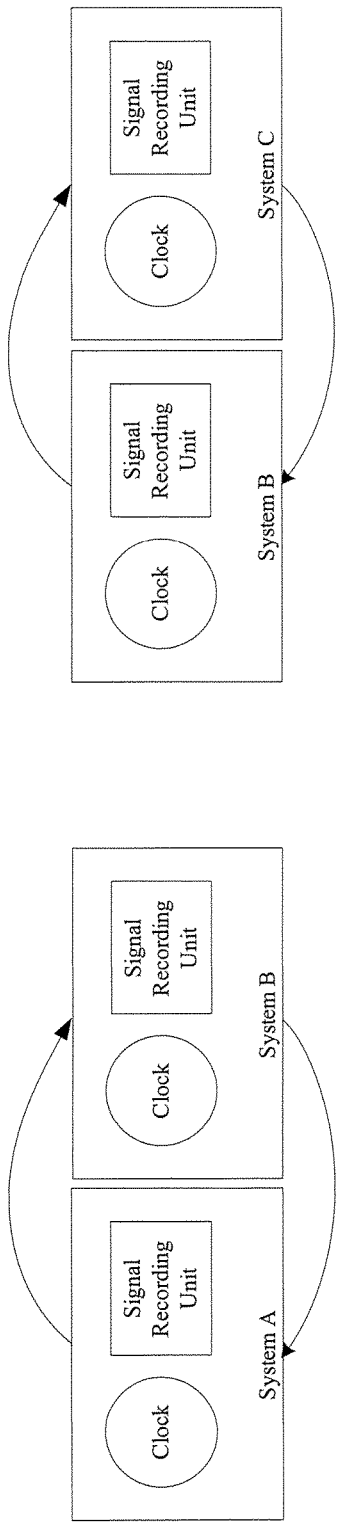
FIG. 4 is a structural schematic diagram illuminating a structure for determining a global clock among systems according to a second embodiment of the present disclosure.

The above measurement and calculation between the reference clock source and the other systems may be performed in any two systems. As shown in FIG. 4, in the second embodiment, the local clock of the system A may serve as a reference clock source to perform measurement and calculation with the system B, to get the clock deviation between the system A and the system B. Then the system B may serve as a reference system to perform measurement and calculation with the system C, to get the clock deviation between the system B and the system C. The clock deviation between the system A and the system C may be further determined based on the clock deviation between the system A and the system B previously determined, and so on, so deviations of all the clock systems in the whole network may be completed.

Figure 5:
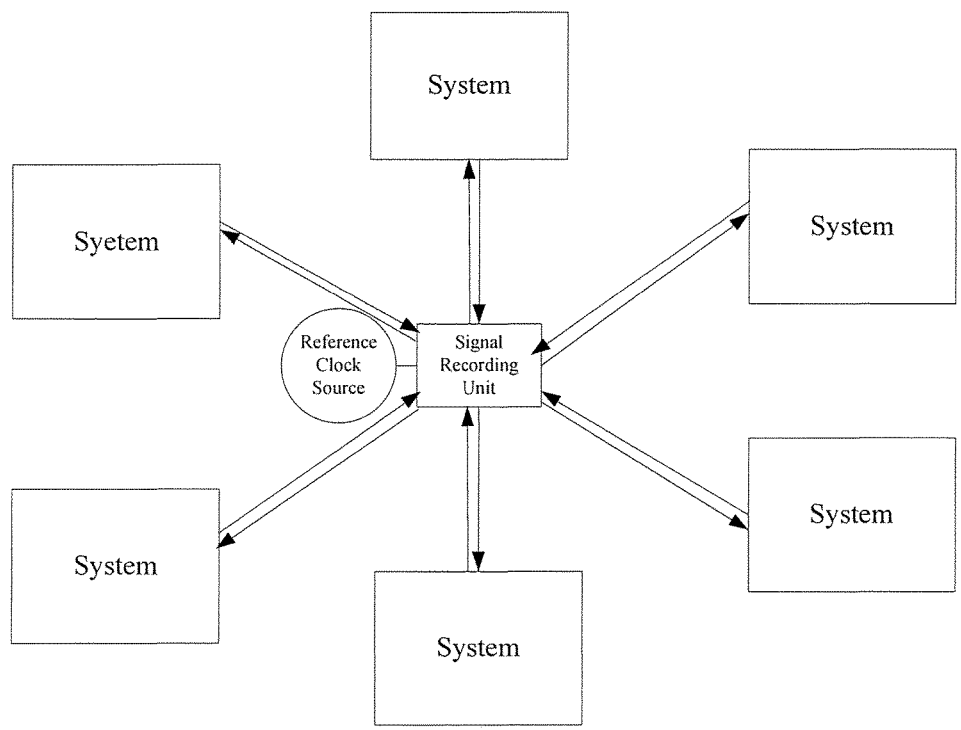
FIG. 5 is a structural schematic diagram illuminating a structure for determining a global clock among systems according to a third embodiment of the present disclosure.

In the third embodiment, as shown in FIG. 5, a structure for determining a global clock among systems is provided, including at least one reference clock source, at least two systems and a signal recording unit cooperated with the reference clock source. The systems are in path connections with each other, the signal recording unit is in a path connection with the reference clock source, and the systems are in bidirectional communication with the signal recording unit to communicate with the reference clock source through the signal recording unit. In this embodiment, the reference clock source is connected with the systems in a star network structure, and a signal recording unit cooperated with the reference clock source is provided between the reference clock source and the systems. A signal recoding unit in a path connection with the local clock may be provided in each system according to the requirement for the time precision. In the case that the local signal recording unit is provided, the local clock of each system is in a bidirectional communication with the lock signal recording unit respectively. In this embodiment, the reference clock source is in a wired connection with the signal recording unit, the signal recording unit is in a wired connection with the systems, and the local clock is in a wired connection with the respective local signal recording unit.

For acquiring the global clock, all the systems may be powered on firstly, and the respective clocks may start to work, to measure and calculated the deviations of the respective clock systems. The local clock of any one of the systems may serve as the reference clock source. The reference clock source may transmit a calibration signal (which may be a simple electrical pulse or clock signal) to other systems. Meanwhile the signal recoding unit of the reference clock source may start to record the time $T_d(0)$. The systems may receive the calibration signal sequentially, due to the different distances from the systems to the reference clock source. For each of the systems, the signal recording unit inside may record the arrival time $T_a$ (n) of the calibration signal after receiving the calibration signal, the return signal (an acknowledgement signal or the calibration signal returned directly through an electrical connection) may be transmitted immediately by the system to the signal recording unit of the reference clock source, and the transmitting time $T_b$ (n) of the return signal may be recorded. Similarly, because of different distances, the signal recording unit may receive the return signal from the systems sequentially, and record the arrival times $T_d$ (n). The time delay between the system and the reference clock source is Delay (n)=($T_d$ (n)−$T_d$ (0))/2 or Delay (n)=($T_d$ (n)−$T_d$ (0)−Δn)/2, where the value of Δn is determined by the above steps, based on the applications. The length of the wire connected between the system and the reference clock source may be calculated as L (n)=Delay (n)*C, where C is a velocity close to the velocity of light. When all the systems are required to have a completely standardized time reference, the reference system may acquire corresponding data of Delay (n), and transmit the data to each system respectively. Each system may calculate the zero deviations $T_c$ (n) of its own local clock from the reference clock source, that is, $T_c$ (n)=($T_a$ (n)−Delay (n)−$T_d$ (0)) or $T_c$ (n)=(Delay(n)+$T_b$(n)−$T_d$(n)), which may be used to correct its own system clock as a correction parameter.

(1) If $T_c$ (n)>0, it means that the zero point of the system clock is earlier than the reference clock source, and this value should be subtracted from the timing system of this system.

(2) If $T_c$ (n)<0, it means that the zero point of the system clock is later than the reference clock source, and this value should be added to the timing system of this system.

As mentioned, for the star network, it is likely that a plurality of systems have the same distance from the reference clock source. During this process, if the acknowledgement signals received by the signal recording unit is less than the system value (which means there are at least two signals overlapped, and it has a very low probability because the signal recording unit is able to identify a signal with a difference above 10 ps to one other), the systems may be measured in batches.

The above embodiments have only shown some modes of extrusion of the present disclosure, which is described more specifically and in detail, but it cannot be considered as limit to the scope of the present disclosure. It should be noted that, for those skilled in the art, these embodiments may have various variants and modifications without departing from the present inventive concept, all belong to the protection scope of the present disclosure. Thus, the protection scope of the present disclosure subjects to the attached claims.

The invention claimed is:

1. A method for determining a global clock among systems which are connected via paths, comprising the following steps:
    (1) determining a clock source to be a reference clock source covering all the systems;
    (2) generating, by the reference clock source, a calibration signal, distributing the calibration signal to each of the systems, and recording a first transmitting time $T_d$ (0) of the calibration signal;
    (3) recording, by each of the systems respectively, a first arrival time $T_a$ (n) of the calibration signal based on a respective local clock upon arrival of the calibration signal at the system, generating a return signal, and recording a second transmitting time $T_b$ (n) of the return signal based on the respective local clock;
    receiving the return signal from each of the systems, and recording a second arrival time $T_d$ (n) upon arrival of the return signal at the reference clock source, so as to determine an absolute deviation Delay (n) of each of the systems from the reference clock source; and
    (4) determining a zero deviation $T_c$ (n) of the respective local clock from the reference clock source respectively, based on the absolute deviation Delay (n), the first arrival time $T_a$ (n) of the calibration signal, and the second transmitting time $T_b$ (n) of the return signal, and taking the zero deviation $T_c$ (n) as a correction parameter to correct the respective local clock of each of the systems, to form a global clock,
    wherein the receiving and recording of the first transmitting time $T_d$ (0) of the calibration signal and the second arrival time $T_d$ (n) of the return signal are implemented by a signal recording unit cooperated with the reference clock source;
    in the step (2), the calibration signal is distributed by the signal recording unit cooperated with the reference clock source to each system;
    the reference clock source and the signal recording unit cooperated with the reference clock source belong to one of the systems;
    in the step (1), the reference clock source is a timer control unit; the calibration signal is formed by an electrical pulse transmitted by the timer control unit directly;
    in the step (3), the first arrival time $T_a$ (n) and the second transmitting time $T_b$ (n) are determined through the respective local clock in each of the systems and a local signal recording unit cooperated with the local clock;

when the system is determined to start to work, the local signal recording unit records a zero time $t_{a0}(n)$ when the system starts to work based on the respective local clock, and the local signal recording unit records a third arrival time $t_{a1}(n)$ of the calibration signal based on the respective local clock when the calibration signal is determined to arrive, such that the first arrival time is $T_a(n)=t_{a1}(n)-t_{a0}(n)$; the local signal recording unit records a third transmitting time $t_{b1}(n)$ of the return signal based on the respective local clock when the return signal is determined to be transmitted, such that the second transmitting time is $T_b(n)=t_{b1}(n)-t_{a0}(n)$;

in the step (3), the return signal is an acknowledgement signal transmitted from each of the systems respectively, or a returned calibration signal, the absolute deviation Delay (n) of each system is determined by:

(I) when the return signal is the acknowledgement signal, Delay $(n)=(T_d(n)-T_d(0)-\Delta n)/2$, wherein $\Delta n$ is a response time of the respective system; and (II) when the return signal is the returned calibration signal, Delay $(n)=(T_d(n)-T_d(0))/2$;

in the step (I), the $\Delta n$ is a system default value; or the $\Delta n$ is determined by the local signal recording unit in the respective system, such that $\Delta n=T_a(n)-T_b(n)$; and in the step (4), $T_c(n)=(T_a(n)-\text{Delay}(n)-T_d(0))$ or $T_c(n)=(\text{Delay}(n)+T_b(n)-T_d(n))$.

2. A method for determining a global clock among systems which are connected via paths, comprising the following steps:

(1) determining a clock source to be a reference clock source covering all the systems;

(2) generating, by the reference clock source, a calibration signal, distributing the calibration signal to each of the systems, and recording a first transmitting time $T_d(0)$ of the calibration signal;

(3) recording, by each of the systems respectively, a first arrival time $T_a(n)$ of the calibration signal based on a respective local clock upon arrival of the calibration signal at the system, generating a return signal, and recording a second transmitting time $T_b(n)$ of the return signal based on the respective local clock;

receiving the return signal from each of the systems, and recording a second arrival time $T_d(n)$ upon arrival of the return signal at the reference clock source, so as to determine an absolute deviation Delay (n) of each of the systems from the reference clock source; and (4) determining a zero deviation $T_c(n)$ of the respective local clock from the reference clock source respectively, based on the absolute deviation Delay (n), the first arrival time $T_a(n)$ of the calibration signal, and the second transmitting time $T_b(n)$ of the return signal, and taking the zero deviation $T_c(n)$ as a correction parameter to correct the respective local clock of each of the systems, to form a global clock, wherein the receiving and recording of the first transmitting time $T_d(0)$ of the calibration signal and the second arrival time $T_d(n)$ of the return signal are implemented by a signal recording unit cooperated with the reference clock source;

in the step (2), the calibration signal is distributed by the signal recording unit cooperated with the reference clock source to each system;

the reference clock source and the signal recording unit cooperated with the reference clock source belong to one of the systems;

in the step (1), the reference clock source includes a timer control unit and a clock generator under the control of the timer control unit;

the calibration signal is formed by a segment of clock signal transmitted by the clock generator driven by the timer control unit;

in the step (3), the first arrival time $T_a(n)$ and the second transmitting time $T_b(n)$ are determined through the respective local clock in each of the systems and a local signal recording unit cooperated with the local clock;

when the system is determined to start to work, the local signal recording unit records a zero time $t_{a0}(n)$ when the system starts to work based on the respective local clock, and the local signal recording unit records a third arrival time $t_{a1}(n)$ of the calibration signal based on the respective local clock when the calibration signal is determined to arrive, such that the first arrival time is $T_a(n)=t_{a1}(n)-t_{a0}(n)$; the local signal recording unit records a third transmitting time $t_{b1}(n)$ of the return signal based on the respective local clock when the return signal is determined to be transmitted, such that the second transmitting time is $T_b(n)=t_{b1}(n)-t_{a0}(n)$;

in the step (3), the return signal is an acknowledgement signal transmitted from each of the systems respectively, or a returned calibration signal, the absolute deviation Delay (n) of each system is determined by:

(I) when the return signal is the acknowledgement signal, Delay $(n)=(T_d(n)-T_d(0)-\Delta n)/2$, wherein $\Delta n$ is a response time of the respective system; and (II) when the return signal is the returned calibration signal, Delay $(n)=(T_d(n)-T_d(0))/2$;

in the step (I), the $\Delta n$ is a system default value; or the $\Delta n$ is determined by the local signal recording unit in the respective system, such that $\Delta n=T_a(n)-T_b(n)$; and in the step (4), $T_c(n)=(T_a(n)-\text{Delay}(n)-T_d(0))$ or $T_c(n)=(\text{Delay}(n)+T_b(n)-T_d(n))$, wherein the signal recording unit cooperated with the reference clock source has a minimum time measure scale less than a half of a clock cycle of the reference clock source;

the local signal recording unit has a minimum time measure scale less than a half of a clock cycle of the local clock; and the signal recording unit has a minimum time measure scale within 1 ns.

3. The method of claim 1, wherein the signal recording unit cooperated with the reference clock source has a minimum time measure scale less than a half of a clock cycle of the reference clock source;

the local signal recording unit has a minimum time measure scale less than a half of a clock cycle of the local clock; and the signal recording unit has a minimum time measure scale within 100 ps.

4. A structure for implementing the method for determining the global clock among the systems of claim 1, comprising the systems connected via paths, the reference clock source and the signal recording unit cooperated with the reference clock source, wherein the signal recording unit cooperated with the reference clock source is in a path connection with the reference clock source, and each of the systems is in communication with the reference clock source through the signal recording unit to determine the zero deviation of various local clocks in the respective system and the reference clock source.

5. A structure for determining a global clock among systems which are connected via paths,
the structure determining the global clock by:
(1) determining a clock source to be a reference clock source covering all the systems;
(2) generating, by the reference clock source, a calibration signal, distributing the calibration signal to each of the systems, and recording a first transmitting time $T_d(0)$ of the calibration signal;
(3) recording, by each of the systems respectively, a first arrival time $T_a(n)$ of the calibration signal based on a respective local clock upon arrival of the calibration signal at the system, generating a return signal, and recording a second transmitting time $T_b(n)$ of the return signal based on the respective local clock;
receiving the return signal from each of the systems, and recording a second arrival time $T_d(n)$ upon arrival of the return signal at the reference clock source, so as to determine an absolute deviation Delay (n) of each of the systems from the reference clock source; and
(4) determining a zero deviation $T_c(n)$ of the respective local clock from the reference clock source respectively, based on the absolute deviation Delay (n), the first arrival time $T_a(n)$ of the calibration signal, and the second transmitting time $T_b(n)$ of the return signal, and taking the zero deviation $T_c(n)$ as a correction parameter to correct the respective local clock of each of the systems, to form a global clock,
wherein the structure comprises the systems, the reference clock source and the signal recording unit cooperated with the reference clock source, the signal recording unit cooperated with the reference clock source is in a path connection with the reference clock source, and each of the systems is in communication with the reference clock source through the signal recording unit to determine the zero deviation of various local clocks in the respective system and the reference clock source,
wherein each of the systems is provided with a signal recording unit in a path connection with its own local clock;
the local clock and the signal recording unit of one of the systems serve as the reference clock source and the signal recording unit cooperated with the reference clock source respectively;
the signal recording unit cooperated with the reference clock source is communicatively connected with the systems; and
the signal recording unit cooperated with the reference clock source is in a wired connection with the reference clock source, the signal recording unit cooperated with the reference clock source is in a wired connection with the systems, and the systems are in wired connections with each other;
in the step (3), the return signal is an acknowledgement signal transmitted from each of the systems respectively, or a returned calibration signal, the absolute deviation Delay (n) of each system is determined by:
(I) when the return signal is the acknowledgement signal, Delay $(n)=(T_d(n)-T_d(0)-\Delta n)/2$, wherein $\Delta n$ is a response time of the respective system; and
(II) when the return signal is the returned calibration signal, Delay $(n)=(T_d(n)-T_d(0))/2$;
in the step (I), the $\Delta n$ is a system default value; or the $\Delta n$ is determined by the local signal recording unit in the respective system, such that $\Delta n=T_a(n)-T_b(n)$; and
in the step (4), $T_c(n)=(T_a(n)-\text{Delay}(n)-T_d(0))$ or $T_c(n)=(\text{Delay}(n)+T_b(n)-T_d(n))$.

6. The structure of claim 4, wherein the systems are communicatively connected with each other sequentially to form at least one linear network structure, and the signal recording unit cooperated with the reference clock source is communicatively connected with one of the systems in each of the at least one linear network structure.

7. The structure of claim 6, wherein the signal recording unit cooperated with the reference clock source is communicatively connected with a system at an end of each of the at least one linear network structure;
the systems are communicatively connected in two-way with each other; and
one of the at least one linear network structure is provided.

8. The structure of claim 4, wherein the systems are in direct communication connections with the signal recording unit cooperated with the reference clock source respectively, to form a star network structure.

9. The structure of claim 4, wherein the signal recording unit cooperated with the reference clock source has a minimum time measure scale less than a half of a clock cycle of the reference clock source;
the local signal recording unit has a minimum time measure scale less than a half of a clock cycle of the local clock;
the signal recording unit cooperated with the reference clock source includes a controller and a time converter in communication with and driven by the controller; and
the time converter is a TDC (time digital converter) or TAC (time analog converter) with a time precision within 100 ps.

10. The structure of claim 5, wherein the reference clock source is a timer control unit, or includes a timer control unit and a clock generator under the control of the timer control unit.

11. The structure of claim 4, wherein the reference clock source is a clock controller, or includes a clock controller and a clock generator under the control of the clock controller.

12. The structure of claim 5, wherein the systems are communicatively connected with each other sequentially to form at least one linear network structure, and the signal recording unit cooperated with the reference clock source is communicatively connected with one of the systems in each of the at least one linear network structure.

13. The structure of claim 12, wherein the signal recording unit cooperated with the reference clock source is communicatively connected with a system at an end of each of the at least one linear network structure;
the systems are communicatively connected in two-way with each other; and
one of the at least one linear network structure is provided.

14. The structure of claim 5, wherein the systems are in direct communication connections with the signal recording unit cooperated with the reference clock source respectively, to form a star network structure.

15. The structure of claim 5, wherein the signal recording unit cooperated with the reference clock source has a minimum time measure scale less than a half of a clock cycle of the reference clock source;
the local signal recording unit has a minimum time measure scale less than a half of a clock cycle of the local clock; and the signal recording unit includes a controller and a time converter in communication with and driven by the controller, and the time converter has a time precision within 1 ns.

* * * * *